(12) United States Patent
King et al.

(10) Patent No.: US 8,380,802 B1
(45) Date of Patent: *Feb. 19, 2013

(54) EMAIL SYSTEM AUTOMATICALLY NOTIFYING SENDER STATUS AND ROUTING INFORMATION DURING DELIVERY

(75) Inventors: Linda Giessel King, San Antonio, TX (US); Christopher Andrew Sandoval, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/186,024

(22) Filed: Jul. 19, 2011

Related U.S. Application Data

(63) Continuation of application No. 12/104,043, filed on Apr. 16, 2008, now Pat. No. 7,984,100.

(51) Int. Cl.
*G06F 15/16* (2006.01)

(52) U.S. Cl. .................... 709/206; 709/207; 709/238

(58) Field of Classification Search .................. 709/206, 709/217, 224, 238, 243, 244, 207; 705/40
See application file for complete search history.

(56) References Cited

U.S. PATENT DOCUMENTS

| | | | |
|---|---|---|---|
| 6,721,784 B1 | 4/2004 | Leonard et al. | |
| 2002/0120697 A1* | 8/2002 | Generous et al. | 709/206 |
| 2004/0193687 A1 | 9/2004 | Christensen et al. | |
| 2004/0249817 A1 | 12/2004 | Liu et al. | |
| 2005/0015450 A1 | 1/2005 | Keohane et al. | |
| 2005/0108208 A1 | 5/2005 | Aoki | |
| 2006/0041505 A1* | 2/2006 | Enyart | 705/40 |
| 2006/0168074 A1* | 7/2006 | Gardner et al. | 709/206 |
| 2007/0255803 A1* | 11/2007 | Cherian | 709/217 |
| 2007/0294390 A1 | 12/2007 | Willey | |
| 2008/0098080 A1 | 4/2008 | Daigle et al. | |
| 2008/0256204 A1* | 10/2008 | Kamat et al. | 709/206 |
| 2009/0049141 A1 | 2/2009 | Jones et al. | |
| 2009/0187631 A1 | 7/2009 | Su et al. | |

FOREIGN PATENT DOCUMENTS

EP    0961447 A1    12/1999

OTHER PUBLICATIONS

"Secure Anonymous E-mail." [online]. Anonymous Speech, Dec. 25, 2006, [Retrieved on Nov. 12, 2007] Retrieved from the Internet: <http://www.anonymousspeech.com/anonymous_email_faq_read_notification.aspx>, (c) 1996-2007 AnonymousSpeech.com.

* cited by examiner

*Primary Examiner* — Le H Luu
(74) *Attorney, Agent, or Firm* — Brooks, Cameron & Huebsch, PLLC

(57) ABSTRACT

An electronic communication such as an email may have multiple file wrappers of metadata added to it by a sender. Each time the email passes to a mail server during its transmission from the sender to a recipient, one of the file wrappers may be stripped off by the mail server and sent to the sender. The information sent back to the sender with the file wrapper may comprise the server name and Internet protocol (IP) address of the computing device the mail server received the email from and the name of the mail server itself, along with a timestamp. In this manner, the sender may be apprised of the location of the email at all times during its transmission, and may be apprised of the route it took during its transmission.

21 Claims, 5 Drawing Sheets

EMAIL SYSTEM AUTOMATICALLY NOTIFYING SENDER STATUS AND ROUTING INFORMATION DURING DELIVERY

CROSS-REFERENCE TO RELATED APPLICATIONS

The present patent application is a Continuation Patent Application of U.S. patent application Ser. No. 12/104,043 filed Apr. 16, 2008, and is related in subject matter in the following commonly assigned applications: 12/104,030, filed on Apr. 16, 2008; and 12/104,034, filed on Apr. 16, 2008.

BACKGROUND

Electronic mail or email is a store and forward method of composing, sending, storing, and receiving messages over electronic communication systems. Email tracking is directed to techniques for monitoring email delivery to an intended recipient. Email traditionally provides no mechanism for tracking a sent message. The system(s) involved will generally make an effort to either deliver mail or return a failure notice ("bounce message"), but there is no guarantee that a message will actually be delivered, let alone read by the recipient. This is in contrast to the postal mail system, which offers registered mail or other forms of tracking and tracing.

Most email tracking technologies use some form of digitally time-stamped record to reveal the exact time and date that an email was opened, along with the Internet protocol (IP) address of the recipient.

A web bug or web beacon is an object that is embedded in an email and is usually invisible to the recipient but allows checking that a recipient has viewed the email, and thus provides a form of email tracking. When the recipient reads the email, the email client requests the image, letting the sender know that the email address is valid and that the email was viewed. However, tracking via web bugs can be prevented by using email clients that do not download images whose uniform resource locators (URLs) are embedded in hypertext markup language (HTML) emails. Many graphical email clients can be configured to avoid accessing remote images. Many modern email readers and email services will not load images when opening an HTML email from an unknown sender or that is suspected to be spam mail. The user must explicitly choose to load images. Web bugs can also be filtered out at the server level so that they never reach the recipient. As a result of these measures, web bugs have lost their effectiveness and cannot be relied on for email tracking. It is thus difficult to confirm electronic delivery or verification of an electronic communication such as an email with high reliability.

SUMMARY

An electronic communication such as an email may have multiple file wrappers of metadata added to it by a sender. Each time the email passes to a mail server during its transmission from the sender to a recipient, one of the file wrappers may be stripped off by the mail server and sent to the sender. The information sent back to the sender with the file wrapper may comprise the server name and Internet protocol (IP) address of the computing device the mail server received the email from and the name of the mail server itself, along with a timestamp. The sender may use this information to determine the location of the email at all times during its transmission, and be apprised of the route it took during its transmission.

In an implementation, a route that the email is likely to take during its transmission from a sender to a recipient may be determined. The route may comprise the number and/or addresses of mail servers that are likely or estimated to transfer the email during its transmission. A number of file wrappers may be added to the email based on the estimate.

In an implementation, a sender may specify the route that an email is to take during its transmission from the sender to a recipient. A number of file wrappers may be added to the email based on the specified number of mail servers.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
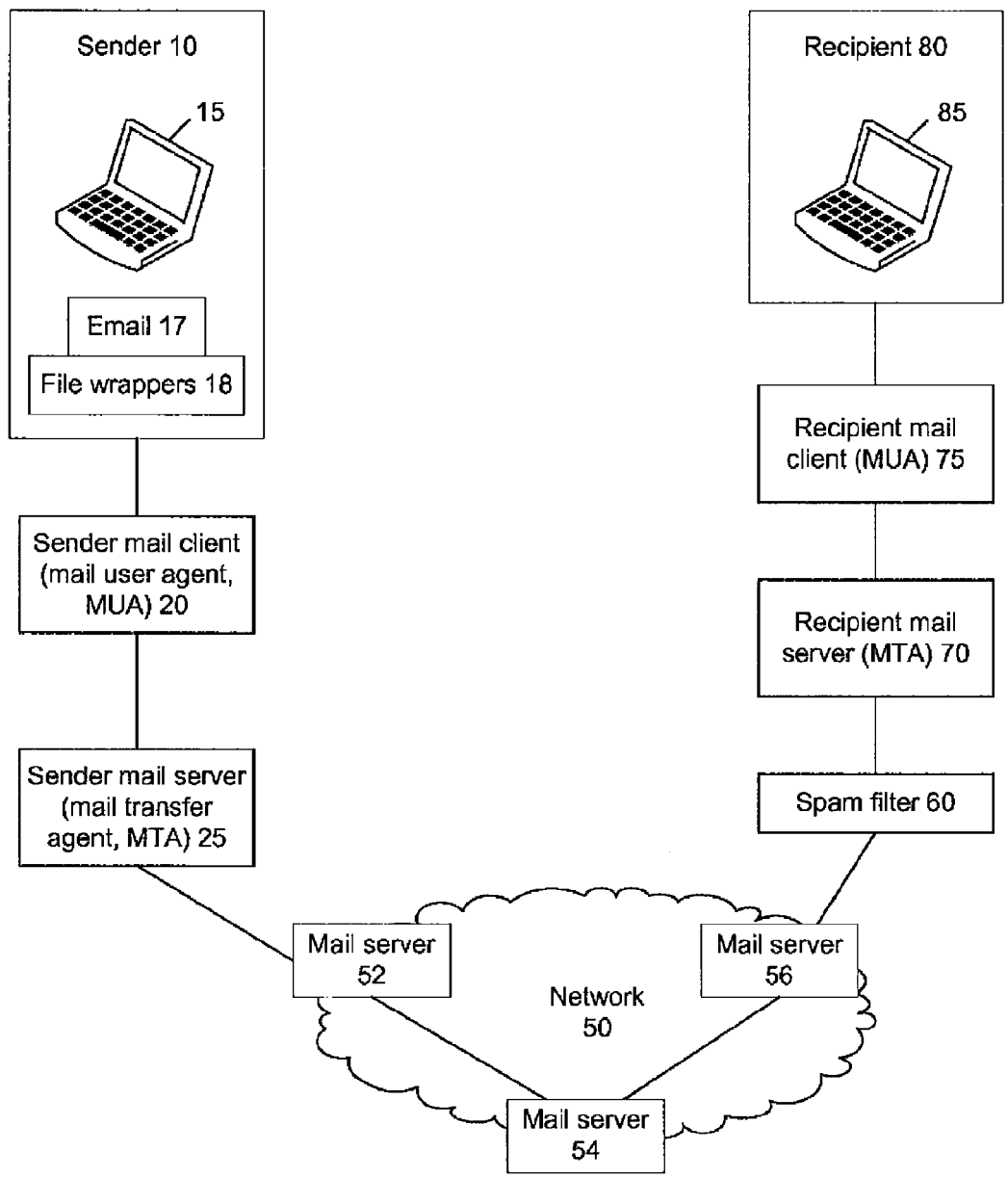
FIG. 1 is a block diagram of an implementation of a system that may be used to provide in-network status of an electronic communication.

FIG. 1 is a block diagram of an implementation of a system 5 that may be used to provide in-network status of an electronic communication, such as an email. A sender 10 has an associated computing device 15 on which an electronic communication or email 17 (referred to herein as an email) may be created. A sender mail client 20 (also referred to as a mail user agent (MUA)) and a sender mail server 25 (also referred to as a mail transfer agent (MTA)) are also shown.

The sender 10 may create an email 17 using the sender mail client 20 and may send the email 17 to a recipient 80, e.g., by typing in an email address of the recipient 80 and clicking "send." The sender mail client 20 may comprise an application the sender 10 uses to compose and read email, such as Microsoft Outlook, etc. The sender mail client 20 may also comprise a mail delivery agent (MDA) to which the email 17 may be transferred. The MDA accepts the email 17, then routes it to local mailboxes or forwards the email 17 to the sender mail server 25 if it is not locally addressed. If the email is not locally addressed, the sender mail client 20 formats the message in Internet email format and uses the Simple Mail Transfer Protocol (SMTP) to send the message to the sender mail server 25, e.g., provided by the sender's Internet Service Provider (ISP). SMTP is the de facto standard for email transmissions across the Internet and specifies the protocol by which email is transmitted. SMTP is a text-based protocol in which one or more recipients of a message are specified along with the message text and possibly other encoded objects.

The sender mail server 25 receives the email 17 and forwards it through a network 50. The sender mail server 25 may comprise a computer program or software agent that transfers electronic mail messages from one computer to another.

The network 50, such as the Internet, may comprise mail servers 52, 54, 56. Although only three mail servers are shown, any number of mail servers may be comprised within the network 50. Additionally or alternatively, the network 50 may comprise any number of devices and services, such as domain name system (DNS) servers and routers, for example. These devices and services may slow when processing an unusually heavy load, may temporarily be unable to receive an email when taken down for maintenance, and sometimes may not have identified themselves properly to the Internet through the DNS so that other mail servers in the network 50 are unable to deliver email as addressed. These devices and services, as well as the components on the recipient side (described below) may be protected by firewalls, spam filters and malware detection software that may bounce or even delete an email. A spam filter 60 is shown between the network 50 and the recipient side of the system 5. It is contemplated that a "whitelist" may be used so that an email may bypass the firewalls, spam filters, and malware detection software. A whitelist is a list of trusted Internet protocol (IP) addresses and domains that allows all mail from these addresses to be delivered. The sender might be whitelisted with ISPs to reduce blocking of electronic delivery to the recipient's email box.

It is contemplated that the network 50 may comprise any type of private or public communication network such as, for example, an intranet, Internet, local area network (LAN), wide area network (WAN), wireless fidelity (WiFi) network, cellular connection, plain old telephone service (POTS), and the like.

In the network 50, the email is routed along a host-to-host chain of mail servers (e.g., mail servers 52, 54, 56). When transferring an email, a sending mail server handles all aspects of mail delivery until the message has been either accepted or rejected by a receiving mail server. Each mail server in the network 50 requests directions from the DNS in order to identify the next mail server in the delivery chain. Parts or all of the path may be specified, deliberately routing a message through a series of mail servers.

To find the recipient's IP address and mailbox, a mail server drills down through the DNS, which consists of a set of servers distributed across the Internet, beginning with the root nameservers at the top-level domain (.tld), then domain nameservers that handle requests for domains within that .tld, and eventually to nameservers that know about the local domain.

For example, the mail server asks the appropriate DNS server which mail exchange (MX) servers have knowledge of the subdomain or local host in the email address. The DNS server responds with an MX record comprising a prioritized list of MX servers for this domain. An MX server is a mail server performing a particular function. To the DNS server, the server that accepts messages is an MX server. When it is transferring messages, it is a mail server. The mail server contacts the MX servers on the MX record in order of priority until it finds the designated host for that address domain. The sending mail server asks if the host accepts messages for the recipient's username at that domain (I.e., username@domain.tld) and transfers the message.

The term mail server is also used to mean a computer acting as an MTA that is running the appropriate software. The term mail exchanger (MX), in the context of the DNS formally refers to an IP address assigned to a device hosting a mail server, and by extension also indicates the server itself.

As shown in FIG. 1, a recipient 80 has an associated computing device 85 on which the email 17 may be received and displayed to the recipient 80. A recipient mail server 70 and a recipient mail client 75 are also shown. After the email 17 is routed through the network 50 and past the spam filter 60, it is accepted for delivery by the recipient mail server 70. The recipient mail server 70 calls a local MDA to deliver the mail to the correct mailbox, where it will sit until it is retrieved by the recipient mail client 75. The recipient 80 may then view the email 17 on the associated computing device 85. For example, the recipient presses the "get mail" button in his MUA, which picks up the message using the Post Office Protocol (POPS). This sequence of events applies to the majority of email users. However, there are many alternative possibilities to the email system.

Although only one sender and one recipient are shown in FIG. 1, it is contemplated that any number of senders and recipients may be included within the system 5. The user computing device may be a laptop or notebook computer, a handheld computing device such as a personal digital assistant (PDA) or a mobile phone, or any type of personal computer (PC), for example. An example computing device is described with respect to FIG. 5.

Additional networks, such as one or more company networks, may also be included within the system 5. For example, a company network might reside between the sender mail client 20 and the sender mail server 25, and another company network might reside between the recipient mail server 70 and the recipient mail client 75. For example, email service providers and other companies that process a large volume of email often have their own private networks. These organizations commonly have multiple mail servers, and route all email through a central gateway server (i.e., mail hub) that redistributes mail to whichever mail server is available. Email on these secondary mail servers must usually wait for the primary mail server (i.e., the designated host for that domain) to become available, at which time the secondary mail server will transfer its messages to the primary mail server.

Email has a particular format, as specified by Request for Comments (RFC) 2822 for example. Multipurpose Internet Mail Extensions (MIME) supplements the email formatting rules to allow non-English text in both email headers and bodies, and defines a mechanism for including non-textual attachments in email bodies.

Email messages generally comprise a header and a body. The header of an email may contain fields such as summary, sender, receiver, and other information about the email. The header may contain an envelope header which may have information that may be hidden from the sender and/or recipient, and a message header which is usually visible. The body of an email may contain the message itself as unstructured text. The header may be separated from the body by a blank line. Each header field has a name and a value. RFC 2822 specifies the precise syntax. Note that the "To" field in the header is not necessarily related to the addresses to which the message is delivered. The actual delivery list is supplied in the SMTP protocol, not extracted from the header content. An email wrapper carries metadata. As described further herein, a mail server can parse a file wrapper of metadata that instructs the mail server to send a message back to the sender.

As an email passes through the delivery chain from sender to recipient, the mail servers add timestamps, message identifiers, and mail server location information to the email, such as in the envelope header's "received" field. The envelope header may also contain a "return path" field. The return path contains the address of the email sender.

The email 17 may have multiple file wrappers 18 of metadata added to it at the sender computing device 15. Any number of file wrappers 18 may be provided to the email 17. The file wrappers 18 may contain information directed to, or responsive to, a server name and IP address of a computing device a mail server received the email from and the name of the mail server itself, along with a timestamp, along with any additional information that the sender chooses to include. In an implementation, the file wrappers 18 may be encrypted using any known encryption technique(s).

Each time the email 17 passes to a mail server during its transmission from the sender 10 to the recipient 80, one of the file wrappers 18 (e.g., the outermost file wrapper) may be stripped off by the mail server and sent to the sender 10, e.g., using the address in the return path field of the envelope header. The information sent back to the sender with the file wrapper may comprise the server name and IP address of the computing device the mail server received the email from and the name of the mail server itself, along with a time stamp. It is contemplated that any information may be contained within a file wrapper. When the email 17 reaches the recipient mail client, 75, another file wrapper may be stripped off and sent back to the sender 10.

In this manner, the sender 10 may be apprised of the location of the email 17 at all times during its transmission, and may be apprised of the route the email 17 took during its transmission. This may help the sender 10 ensure the email 17 was not compromised during transmission, and ensure that the email 17 was properly delivered to the recipient mail client 75 and/or the recipient 80.

The number of file wrappers 18 may be set to a very large number so that there will be enough file wrappers regardless of how many mail servers the email 17 passes through during transmission from the sender 10 to the recipient 80. Alternatively, the sender 10 may estimate the number of mail servers the email 17 will be sent through, and set the number of file wrappers to that number, or that number plus one to account for a file wrapper being stripped off the email 17 when the email 17 reaches the recipient mail client 75. The estimate may take place using a variety of techniques described further herein.

Figure 2:
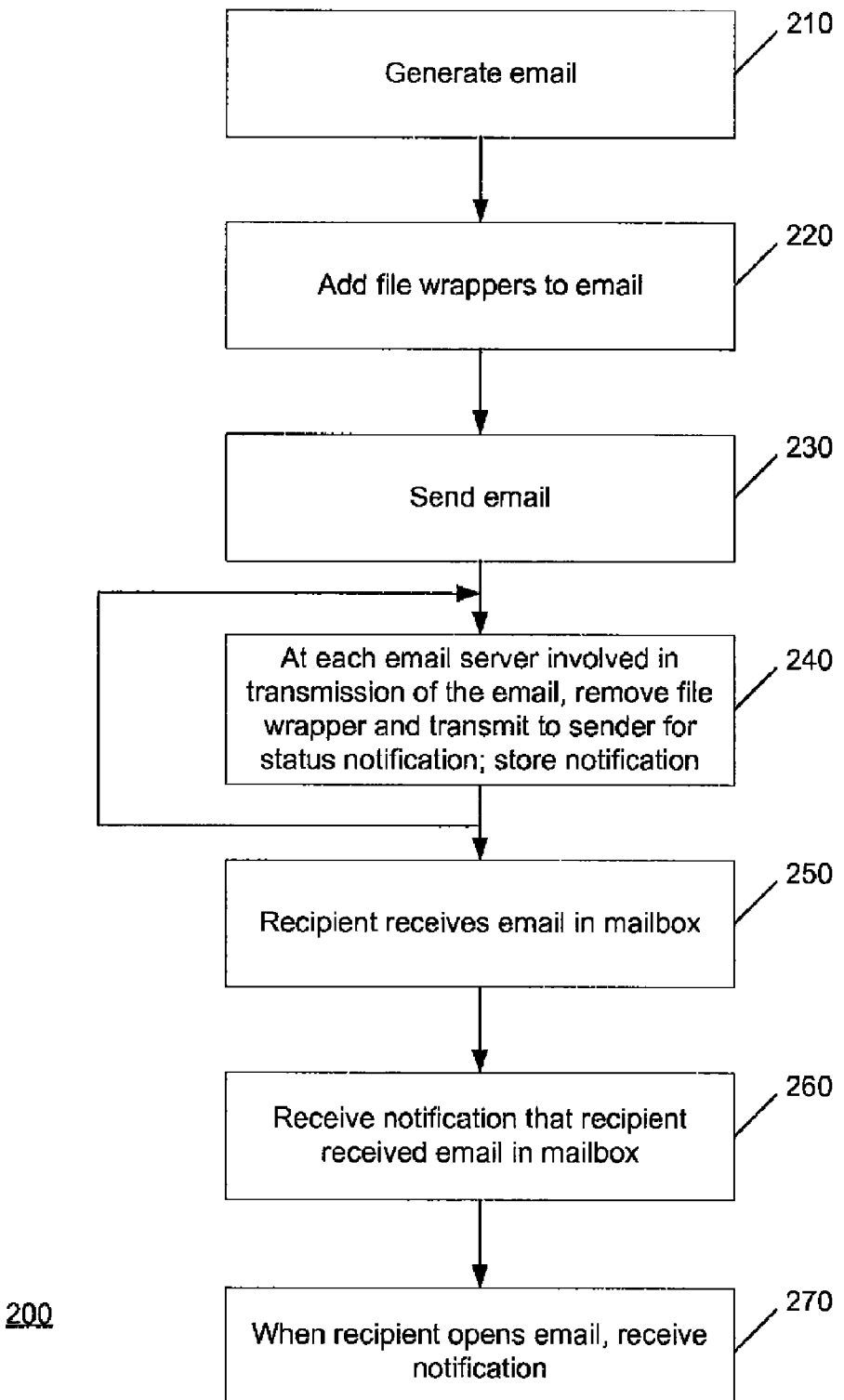
FIG. 2 is an operational flow of an implementation of a method that may be used to provide in-network status of an electronic communication.

FIG. 2 is an operational flow of an implementation of a method 200 that may be used to provide in-network status of an electronic communication. An electronic communication, such as an email, may be generated at operation 210.

File wrappers may be added to the email at operation 220. File wrappers may be added by a sender mail client or other component or application residing on or associated with the sender or sender computing device. A number of file wrappers is added to the email that is equal to or greater than the number of mail servers that the email is likely to be passed through during transmission from the sender to the recipient. In an implementation, the number of file wrappers added is set to a large number (e.g., 100, 255, etc.) that is likely much greater than the number of mail servers that the email is likely to be passed through during transmission. In another implementation, the number of file wrappers is based on an estimate or determination of the number of mail servers that the email is likely to be transmitted through. In this manner, a more precise number of file wrappers is added.

At operation 230, the email may be sent. The email may be sent by a user who generated the email or by another user or entity, such as a common carrier. At each point (e.g., mail server) during the transmission of the email from the sender 10 to the recipient 80, a file wrapper is removed, decrypted (if optional encryption is used), and transmitted back to the sender as a notification, at operation 240. In an implementation, the message itself as well as the file wrappers could be encrypted individually wherein the unwrapping of one file wrapper decrypts the next file wrapper.

At operation 250, the email is transmitted to the recipient's mailbox. At this point, at operation 260, a file wrapper may be stripped off the email and transmitted to the sender as a notification. This provides the sender with a record, in real-time as the email is being transmitted, of where and when the email or other electronic communication is at all points during transmission. The notifications may be stored by the sender, and may be used as evidence to certify where and when the email or other electronic communication was at all points during transmission.

In an implementation, when the recipient opens or downloads the email, a notification may be sent to the sender at operation 270. The email may contain a mechanism that notifies the sender when it has been delivered, viewed in a preview pane, and/or opened. Mechanisms might include a web beacon, a web bug, or a read receipt, which are all known and their descriptions are omitted for brevity. In an implementation, the username of the logged in user could be recorded by the software object and transmitted back to the sender.

Figure 3:
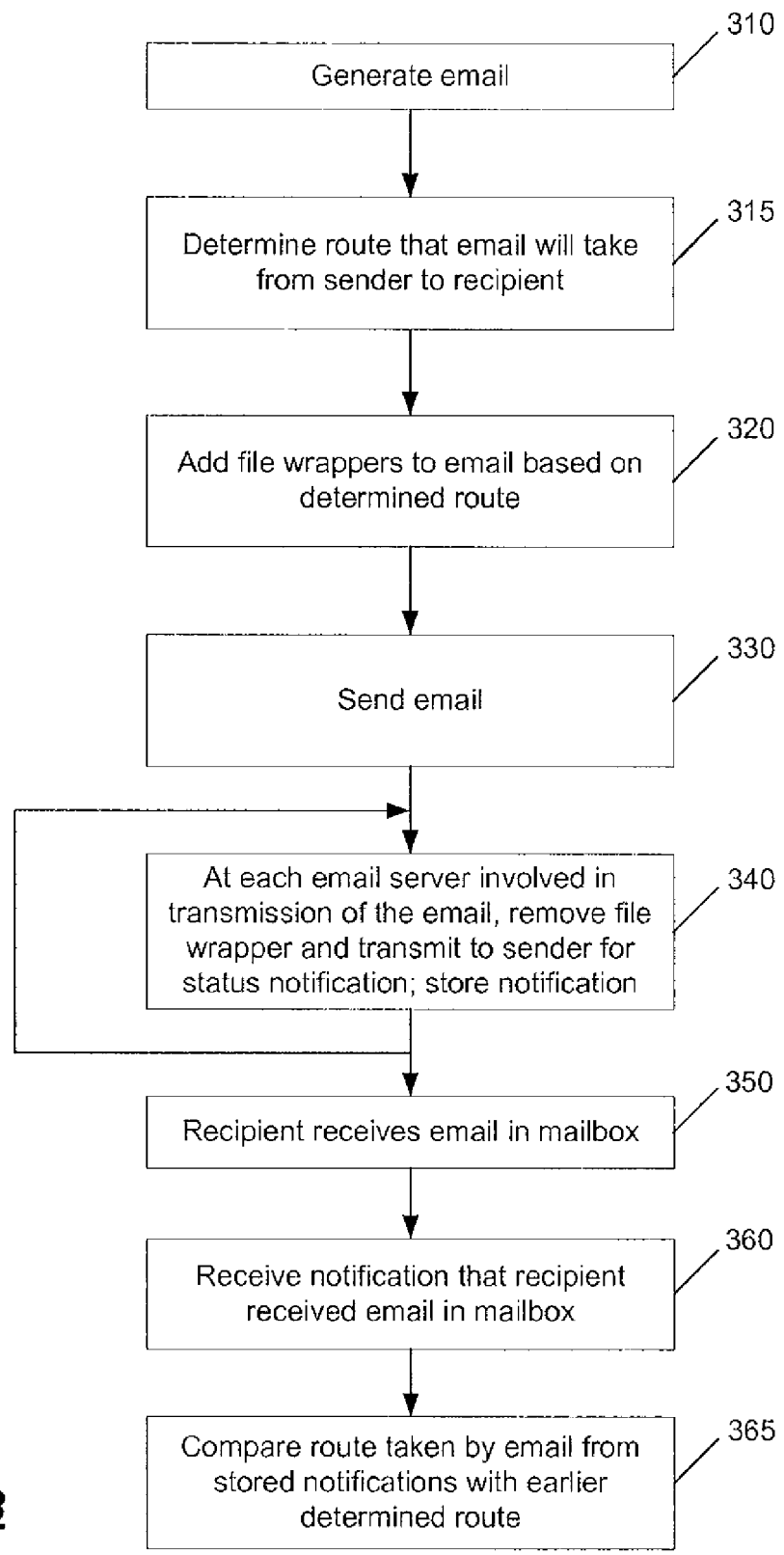
FIG. 3 is an operational flow of another implementation of a method that may be used to provide in-network status of an electronic communication.

FIG. 3 is an operational flow of another implementation of a method 300 that may be used to provide in-network status of an electronic communication. An electronic communication, such as an email, may be generated at operation 310.

At operation 315, a route that the email is likely to take during its transmission from the sender to the recipient may be determined. The route may comprise the number and/or addresses of mail servers that are likely or estimated to transfer the email during its transmission. One or more tracing techniques may be used in the determination of the mail servers. In an implementation, the tracing techniques may be based on or similar to the well known "trace route" and/or "what route" commands, services, applications, and processes that are available.

At operation 320, a number of file wrappers may be added based on the estimated number of mail servers. In an implementation, the number of file wrappers may be set equal to the number of mail servers, the number of mail servers plus one (to account for the recipient mail server), or the number of mail servers plus two (to account for the recipient mail server and the recipient's mailbox).

Operations 330 through 360 may be similar to operations 230 through 260 described with respect to the method 200 of FIG. 2. At operation 330, the email may be sent, and at each point during the transmission of the email from the sender to the recipient, a file wrapper is removed, decrypted (if optional encryption is used), and transmitted back to the sender as a notification, at operation 340. At operation 350, the email is transmitted to the recipient's mailbox, and another file wrapper may be stripped off the email and transmitted to the sender as a notification at operation 360. The notifications may be stored by the sender.

At operation 365, the sender may compare a record of the received file wrapper notifications from the mail servers or other devices or services involved in the email transmission with the route that was determined at operation 315 prior to the email transmission. The sender may confirm that the email took the estimated route during and/or after transmission of the email from the sender to the recipient. In this manner, the sender may have additional evidence to verify and certify where and when the email or other electronic communication was at all points during transmission.

Figure 4:
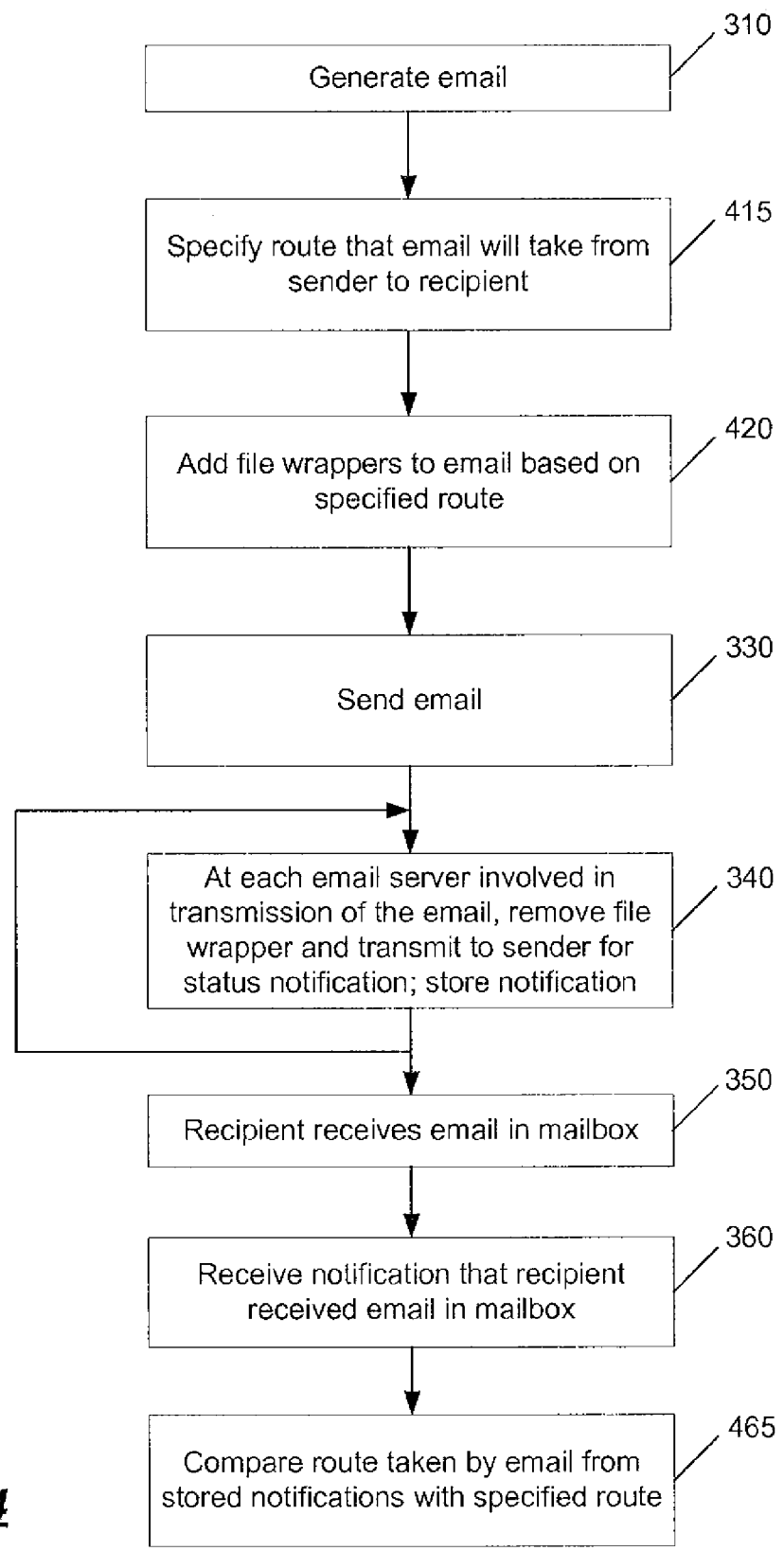
FIG. 4 is an operational flow of another implementation of a method that may be used to provide in-network status of an electronic communication.

FIG. 4 is an operational flow of another implementation of a method 400 that may be used to provide in-network status of an electronic communication. The method 400 is similar to the method 300 described with respect to FIG. 3, and similar operations are labeled identically and their descriptions are omitted for brevity.

Before or after the email is generated, a sender may specify at operation 415 the route that the email is to take during its transmission from the sender to the recipient. The route may comprise the names and/or addresses of mail servers that are to be involved in the transfer of the email during its transmission. At operation 420, a number of file wrappers is added based on the specified number of mail servers from operation 415. The number of file wrappers may be set equal to the number of mail servers, the number of mail servers plus one (to account for the recipient mail server), or the number of mail servers plus two (to account for the recipient mail server and the recipient's mailbox).

The email may then be sent to the recipient at operations 330 through 360, as described above. At operation 465, the sender may compare a record of the received file wrapper notifications from the mail servers or other devices or services involved in the email transmission with the route that was specified at operation 415 prior to the email transmission. The sender may confirm that the email took the specified route during and/or after transmission of the email from the sender to the recipient. In this manner, the sender may have additional evidence to verify and certify where and when the email or other electronic communication was at all points during transmission.

Exemplary Computing Arrangement

Figure 5:
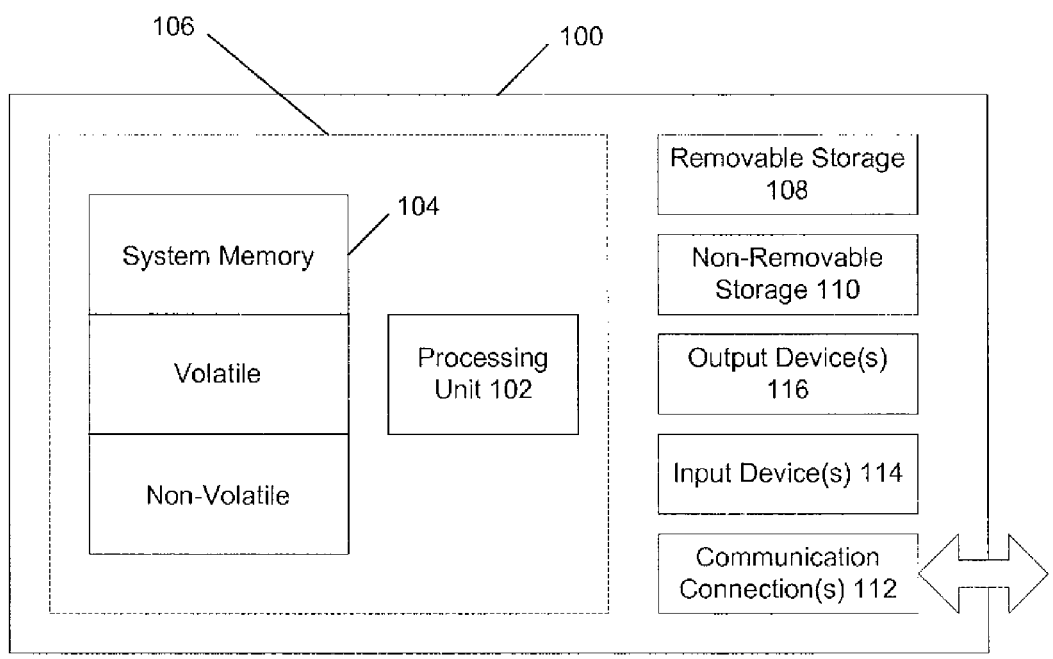
FIG. 5 is a block diagram of an example computing environment in which example embodiments and aspects may be implemented.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc, that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 5 by dashed line 106.

Computing device 100 may have additional features and/or functionality. For example, computing device 100 may include additional storage (removable and/or non-removable) including, but not limited to, magnetic or optical disks or tape. Such additional storage is illustrated in FIG. 5 by removable storage 108 and non-removable storage 110.

Computing device 100 typically includes a variety of computer-readable media. Computer-readable media can be any available media that can be accessed by computing device 100 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 104, removable storage 108, and non-removable storage 110 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Computing device 100 may be one of a plurality of computing devices 100 inter-connected by a network. As may be appreciated, the network may be any appropriate network, each computing device 100 may be connected thereto by way of communication connection(s) 112 in any appropriate manner, and each computing device 100 may communicate with one or more of the other computing devices 100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic communication status checking method, comprising:
   generating, by at least one hardware processor, an electronic communication at a sender, the electronic communication comprising a plurality of file wrappers;
   transmitting, by at least one hardware processor, the electronic communication to a recipient over a network comprising a plurality of mail servers;
   stripping off, by at least one hardware processor, one of the file wrappers at at least one of the mail servers;
   generating, by at least one hardware processor, a notification based on the file wrapper that was stripped off that at least one of the servers received the electronic communication; and
   transmitting, by at least one hardware processor, the notification to the sender.

2. The method of claim 1, wherein the notification comprises information used to confirm a route the electronic communication took over the network.

3. The method of claim 1, further comprising:
   stripping off additional file wrappers at additional mail servers as the electronic communication passes through the additional mail servers;
   generating additional notifications based on the additional file wrappers; and
   transmitting the additional notifications to the sender.

4. The method of claim 1, further comprising:
   stripping off an additional file wrapper at a recipient mail server when the electronic communication is received at the recipient mail server;
   generating an additional notification based on the additional file wrapper; and
   transmitting the additional notification to the sender.

5. The method of claim 4, wherein the additional notification comprises information used to confirm that the recipient received the electronic communication.

6. The method of claim 1, further comprising whitelisting the sender with a service provider associated with the recipient.

7. The method of claim 1, wherein a number of the plurality of file wrappers is based on a route the electronic communication is to take across the network, the route being determined or specified prior to transmitting the electronic communication to the recipient over the network.

8. A non-transitory computer-readable medium storing computer-readable instructions for electronic communication status checking, said computer-readable instructions comprising instructions stored thereon that are executed by a processor to:
   generate an electronic communication at a sender, the electronic communication comprising a plurality of file wrappers;
   transmit the electronic communication to a recipient over a network comprising a plurality of mail servers;
   strip off one of the file wrappers at least one of the mail servers;
   generate a notification based on the file wrapper that at least one of the servers received the electronic communication; and
   transmit the notification to the sender.

9. The computer-readable medium of claim 8, wherein the notification comprises information used to confirm a route the electronic communication took over the network.

10. The computer-readable medium of claim 8, further comprising instructions that:
    strip off additional file wrappers at additional mail servers as the electronic communication passes through the additional mail servers;
    generate additional notifications based on the additional file wrappers; and
    transmit the additional notifications to the sender.

11. The computer-readable medium of claim 8, further comprising instructions that:
    strip off an additional file wrapper at a recipient mail server when the electronic communication is received at the recipient mail server;
    generate an additional notification based on the additional file wrapper; and
    transmit the additional notification to the sender.

12. The computer-readable medium of claim 11, wherein the additional notification comprises information used to confirm that the recipient received the electronic communication.

13. The computer-readable medium of claim 8, further comprising instructions that whitelist the sender with a service provider associated with the recipient.

14. The computer-readable medium of claim 8, wherein a number of the plurality of file wrappers is based on a route the electronic communication is to take across the network, the route being determined or specified prior to transmitting the electronic communication to the recipient over the network.

15. An electronic communication status checking system, the system comprising a computing device with a processor and memory for storing executable instructions that are executable by the processor to:
- generate an electronic communication at a sender, the electronic communication comprising a plurality of file wrappers;
- transmit the electronic communication to a recipient over a network comprising a plurality of mail servers;
- strip off one of the file wrappers at least one of the mail servers;
- generate a notification based on the file wrapper that at least one of the servers received the electronic communication; and
- transmit the notification to the sender.

16. The system of claim 15, wherein the notification comprises information used to confirm a route the electronic communication took over the network.

17. The system of claim 15, further comprising:
- at least one subsystem that strips off additional file wrappers at additional mail servers as the electronic communication passes through the additional mail servers;
- at least one subsystem that generates additional notifications based on the additional file wrappers; and
- at least one subsystem that transmits the additional notifications to the sender.

18. The system of claim 15, further comprising:
- at least one subsystem that strips off an additional file wrapper at a recipient mail server when the electronic communication is received at the recipient mail server;
- at least one subsystem that generates an additional notification based on the additional file wrapper; and
- at least one subsystem that transmits the additional notification to the sender.

19. The system of claim 18, wherein the additional notification comprises information used to confirm that the recipient received the electronic communication.

20. The system of claim 15, further comprising at least one subsystem that whitelists the sender with a service provider associated with the recipient.

21. The system of claim 15, wherein a number of the plurality of file wrappers is based on a route the electronic communication is to take across the network, the route being determined or specified prior to transmitting the electronic communication to the recipient over the network.

* * * * *